US007587056B2

(12) United States Patent
Zhang

(10) Patent No.: US 7,587,056 B2
(45) Date of Patent: Sep. 8, 2009

(54) SMALL ARRAY MICROPHONE APPARATUS AND NOISE SUPPRESSION METHODS THEREOF

(75) Inventor: Ming Zhang, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 44 days.

(21) Appl. No.: 11/737,780

(22) Filed: Apr. 20, 2007

(65) Prior Publication Data

US 2008/0069374 A1 Mar. 20, 2008

Related U.S. Application Data

(60) Provisional application No. 60/825,586, filed on Sep. 14, 2006.

(51) Int. Cl.
*H04B 15/00* (2006.01)
*H04R 3/00* (2006.01)

(52) U.S. Cl. .......................... 381/94.1; 381/91; 381/92; 381/111; 381/97; 381/57

(58) Field of Classification Search ................ 381/94.1, 381/91, 92, 122, 95, 111, 112, 1, 2, 3, 97, 381/94.2, 94.3, 87, 57, 56, 113
See application file for complete search history.

(56) References Cited

U.S. PATENT DOCUMENTS 7,190,292 B2 * 3/2007 Bizjak ........................ 341/139
2004/0258255 A1 * 12/2004 Zhang et al. .................. 381/92
2005/0147258 A1 * 7/2005 Myllyla et al. ........... 381/71.11
2006/0093128 A1 * 5/2006 Oxford .................. 379/406.01

OTHER PUBLICATIONS

International Search Report and Written Opinion, dated Sep. 23, 2008.

* cited by examiner

*Primary Examiner*—Vivian Chin
*Assistant Examiner*—Con P Tran
(74) *Attorney, Agent, or Firm*—Thomas, Kayden, Horstemeyer & Risley

(57) ABSTRACT

The small array microphone apparatus comprises first and second omni-directional microphones, a microphone calibration unit and a directional microphone forming unit. The first and second omni-directional microphones respectively convert sound from a desired near-end talker into first and second signals. The second and first omni-directional microphones and the desired near-end talker are arranged in a line. The microphone calibration unit receives the first and second signals, calibrates on gain, and correspondingly outputs first and second calibration signals. The directional microphone forming unit receives the first and second calibration signals to output a first directional microphone signal with a predefined directivity according to a control signal and a second directional microphone signal with a fixed directivity for noise detection. Determination of the control signal is based on whether environmental noise power generated by an environmental detection unit, exceeds a predefined threshold.

15 Claims, 6 Drawing Sheets

SMALL ARRAY MICROPHONE APPARATUS AND NOISE SUPPRESSION METHODS THEREOF

BACKGROUND OF THE INVENTION

1. Field of the Invention

The invention relates to a small array microphone, and in particular to noise suppression using small array microphone.

2. Description of the Related Art

Noise suppression is often required in many communication systems and voice recognition devices to suppress noise to improve communication quality and voice recognition performance. Noise suppression may be achieved using various techniques, which may be classified as single microphone techniques and array microphone techniques.

Array microphone noise reduction technique uses multiple microphones placed at different locations and separated from each other by some minimum distance to form a beam. Conventionally, the beam is used to pick up speech that is then used to reduce the amount of noise picked up outside the beam. Thus, the array microphone techniques can suppress non-stationary noise. Multiple microphones, however, also themselves create more noise.

Thus, effective suppression of noise in communication system and voice recognition devices is desirable.

BRIEF SUMMARY OF THE INVENTION

A detailed description is given in the following embodiments with reference to the accompanying drawings.

An embodiment of a small array microphone apparatus is provided. The small array microphone apparatus comprises first and second omni-directional microphones, a microphone calibration unit and a directional microphone forming unit. The first and second omni-directional microphones respectively convert sound from a desired near-end talker into first and second signals. The second and first omni-directional microphones and the desired near-end talker are arranged in a line. The microphone calibration unit receives the first and second signals, calibrates on gain, and correspondingly outputs first and second calibration signals. The directional microphone forming unit receives the first and second calibration signals to output a first directional microphone signal with a predefined directivity according to a control signal and a second directional microphone signal with a fixed directivity for noise detection. Establishment of the control signal is based on whether environmental noise power generated by an environmental detection unit exceeds a predefined threshold.

An embodiment of a noise suppression method is provided. The noise suppression method comprises arranging first and second omni-directional microphones and a desired near-end talker in a line, calibrating each band of a first signal and second signal from the first and second omni-directional microphones to correspondingly generate first and second calibration signals, generating a first directional microphone signal with a predefined directivity according to the first calibration signal, the second calibration signal, and a control signal, and generating a second directional microphone signal with fixed directivity for noise detection according to the first and second calibration signals. Determination of the control signal is based on whether environmental noise power exceeds a predefine threshold.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
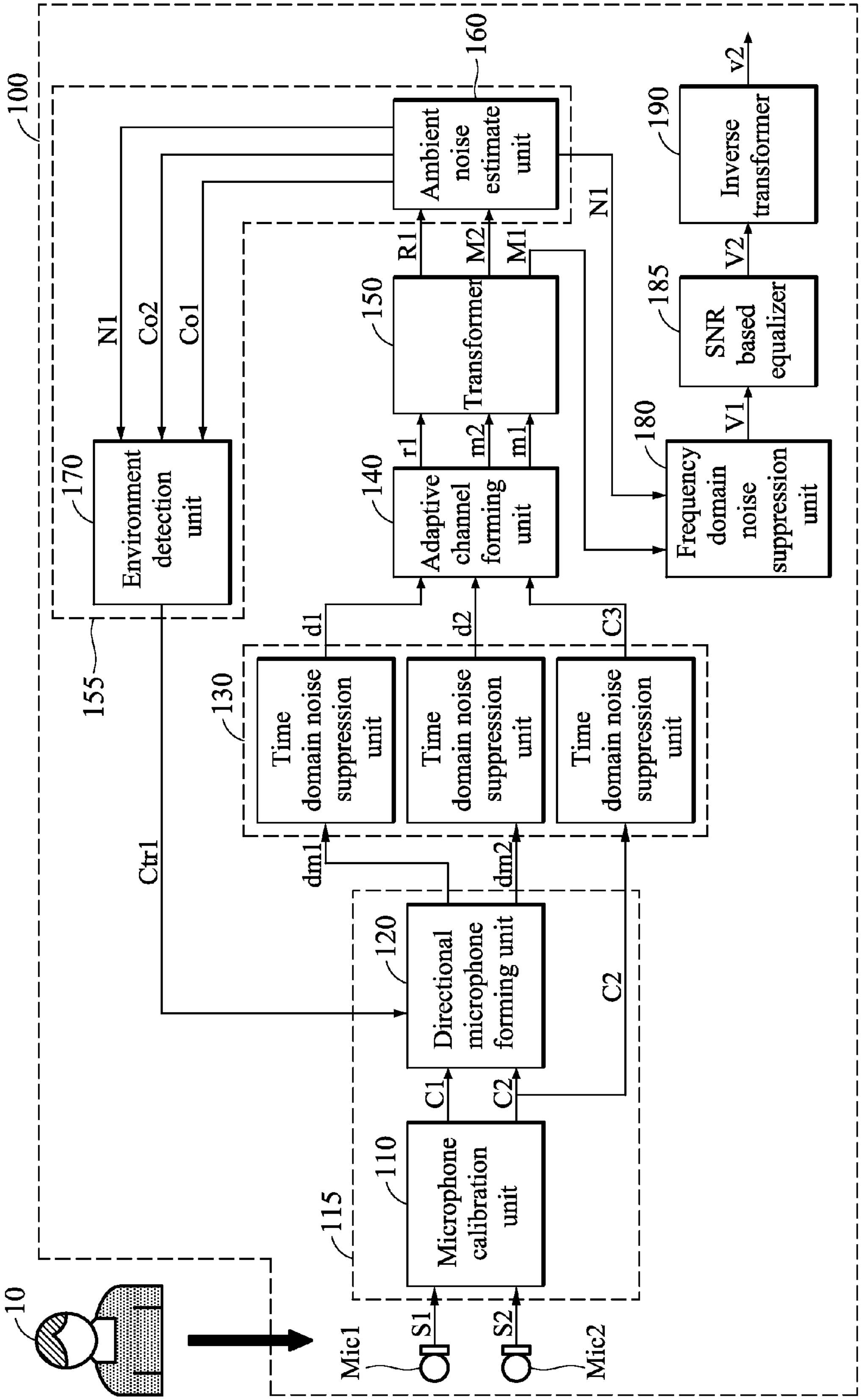
FIG. 1 is a schematic diagram of a small array microphone apparatus according to an embodiment of the invention.

FIG. 1 is a schematic diagram of small array microphone apparatus 100 according to an embodiment of the invention. Small array microphone apparatus 100 comprises omni-directional microphones Mic1 and Mic2, microphone calibration unit 110, directional microphone forming unit 120, time domain noise suppression unit 130, adaptive channel forming unit 140, transformer 150, detection unit 155, frequency domain noise suppression unit 180, SNR based equalizer 185 and inverse transformer 190. Small array microphone apparatus 100 detects environmental noise to adjust directional microphone signals dm1 and dm2 of directivity for noise suppression. In addition, detection unit 155 comprises ambient noise estimate unit 160 and environmental detection unit 170.

As shown in FIG. 1, the desired near-end talker P1 and omni-directional microphone Mic1 and Mic2 are arranged in a line, referred to as an end-fire way. Omni-directional microphone Mic1 and Mic2 respectively convert sound from the desired near-end talker 10 into signals S1 and S2. Microphone calibration unit 110 receives signals S1 and S2, calibrates on gain, and correspondingly outputs calibration signals C1 and C2. Directional microphone forming unit 120 receives calibration signals C1 and C2 and outputs directional microphone signal dm1 with a predefined directivity according to control signal Ctrl and directional microphone signal dm2 with a fixed directivity for noise detection. Control signal Ctrl is determined by whether environmental noise power generated by environmental detection unit 170 exceeds a predefined threshold. According to another embodiment of the invention, the directional microphone signal dm2 with the fixed directivity is a signal with a cardioid, super-cardioid or hyper-cardioid polar pattern for noise detection. The directional microphone signal dm1 with predefined directivity is a signal with a similar omni-directional polar pattern when the environmental noise power is below the predefined threshold. The directional microphone signal dm1 with predefined directivity is a signal with a cardioid, super-cardioid or hyper-cardioid polar pattern when the environmental noise power exceeds the predefined threshold.

Time domain noise suppression unit 130 receives directional microphone signals dm1 and dm2 and calibration signal C2, suppresses noise, and correspondingly outputs directional signals d1 and d2 and calibration signal C3 to adaptive channel forming unit 140.

Adaptive channel forming unit 140 receives directional signals d1 and d2 and calibration signal C3 to respectively generate first main channel signal m1, second main channel signal m2 and reference channel signal r1. Second main channel signal m2 is indirectly provided to ambient noise estimate unit 160 for environmental detection.

Transformer 150 transforms first main channel signal m1, second main channel signal m2 and reference signal r1 from time domain to frequency domain to correspondingly output main channel signals M1 and M2 and reference channel signal R1. Main channel signal M2 and reference channel R1, frequency domain signals, are provided to ambient noise estimate unit 160 of detection unit 155.

Ambient noise estimate unit 160 receives and compares reference channel signal R1 and main channel signal M2 to output control signals Co1 and Co2 and noise estimate signal N1 to environmental detection unit 170. Environmental detection unit 170 generates control signal Ctrl according to control signals Co1 and Co2 and noise estimate signal N1 to control directional microphone signal dm1 with the predefined directivity.

Frequency domain noise suppression unit 180 receives main channel signal M1 and noise estimate signal N1, suppresses noise of main channel signal M1 according to noise estimate signal N1 and generates clear voice signal V1. SNR based equalizer 185 equalizes clear voice signal V1 to generate clear voice signal V2. Inverse transformer 190 transforms clear voice signal V2 from frequency domain to time domain to generate clear voice signal v2.

Figure 2:
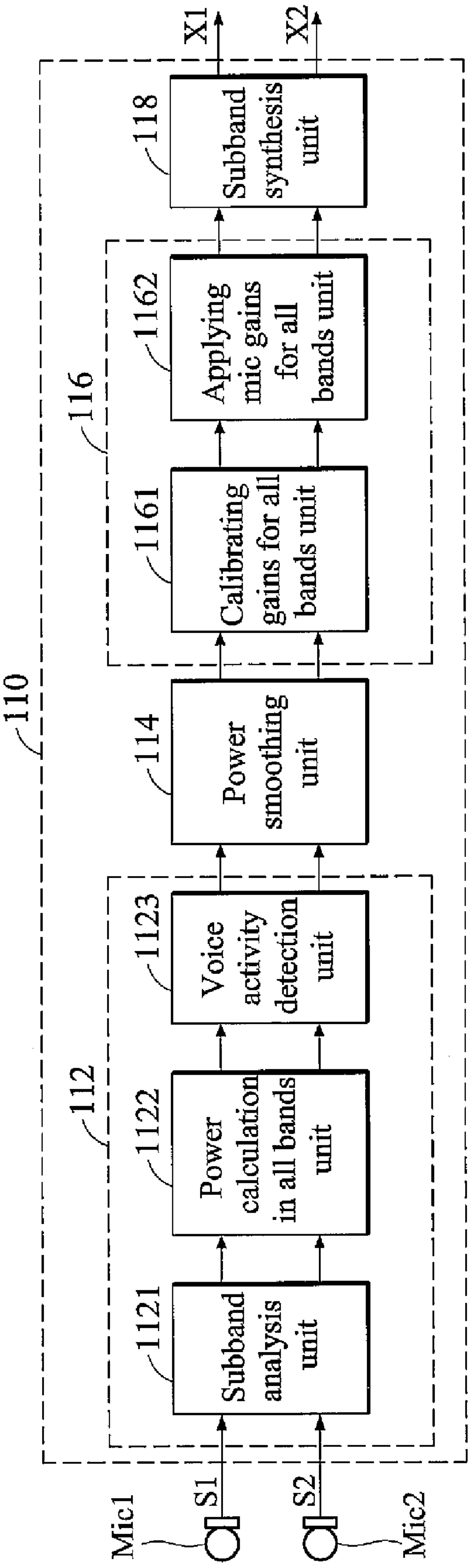
FIG. 2 is a schematic diagram of a microphone calibration unit according to another embodiment of the invention.

FIG. 2 is a schematic diagram of microphone calibration unit 110 according to another embodiment of the invention. Microphone calibration unit 110 comprises power detection unit 112, power smoothing unit 114, calibration unit 116 and subband synthesis unit 118. Power detection unit 112 comprises subband analysis unit 1121, power calculation in all bands unit 1122 and voice activity detection unit 1123. Power detection unit 112 detects power of each band of signals S1 and S2. Power smoothing unit 114 smoothes each band of signals S1 and S2. Calibration unit 116 comprises calibrating gains for all bands unit 1161 and applying mic gains for all bands unit 1162. Calibrating gains for all bands unit 1161 calibrates each band of signals S1 and S2 by multiplying calibrating gains to each band of the signal S1, wherein the calibrating gains are generated by each band of signal S2 divided by each band of signal S1. Applying gains for all bands unit 1162 may comprise multiplication of a predefined gain for all bands of signals S1 and S2. Subband synthesis unit 118 synthesizes each band of signals S1 and S2 to generate calibration signals X1 and X2.

Figure 3:
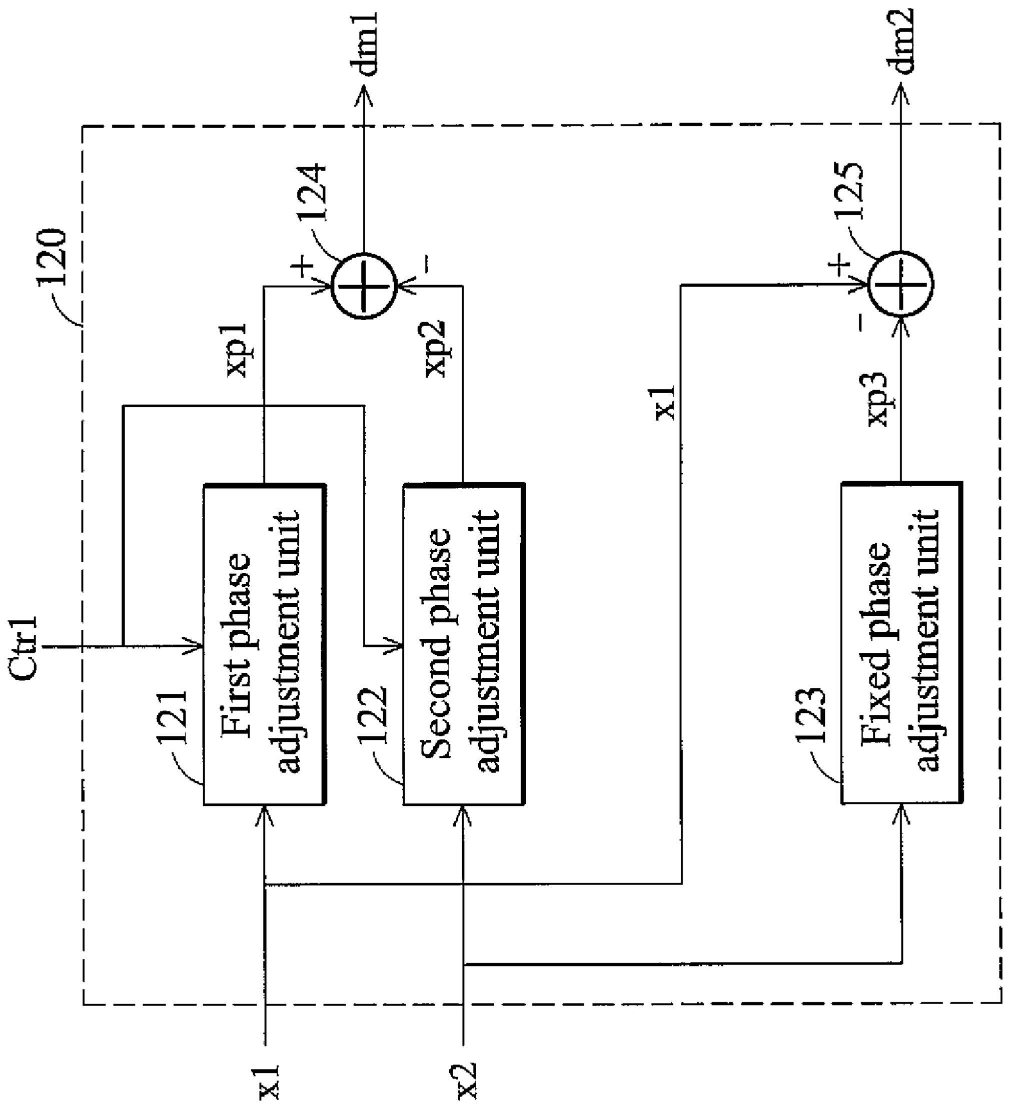
FIG. 3 is a schematic diagram of a directional microphone forming unit according to another embodiment of the invention.

FIG. 3 is a schematic diagram of directional microphone forming unit 120 according to another embodiment of the invention. Directional microphone forming unit 120 comprises first phase adjustment unit 121, second phase adjustment unit 122, fixed phase adjustment unit 123, and subtractors 124 and 125.

First phase adjustment unit 121 shifts calibration signal X1 first phase P1 according to control signal Ctrl to generate signal XP1. First phase P1 is a positive value P0 for compensating sound propagation from omni-directional microphone Mic1 to omni-directional microphone Mic2 when the environmental noise power is below the predefined threshold. Phase P1 is less than the positive value P0 when the environmental noise power exceeds the predefined threshold. The environmental noise power is detected by detection device 155.

Second phase adjustment unit 122 shifts calibration signal X2 second phase P2 according to control signal Ctrl to generate signal XP2. Second phase P2 is 180° for two calibration signal X1 and X2 added together with the same phase when the environmental noise power is below the predefined threshold. Second phase P2 is 0° when the environmental noise power exceeds the predefined threshold.

Fixed phase adjustment unit 123 shifts calibration signal X2 fixed phase P3 to generate signal XP3. First subtractor 124 subtracts signal XP2 from signal XP1 to generate first directional microphone signal dm1, directivity of which is changed by control signal Ctr1. Second subtractor 125 subtracts signal XP3 from signal X1 to generate the second directional microphone signal dm2 with fixed directivity, such as super-cardioid or hyper-cardioid for noise detection.

Figure 4:
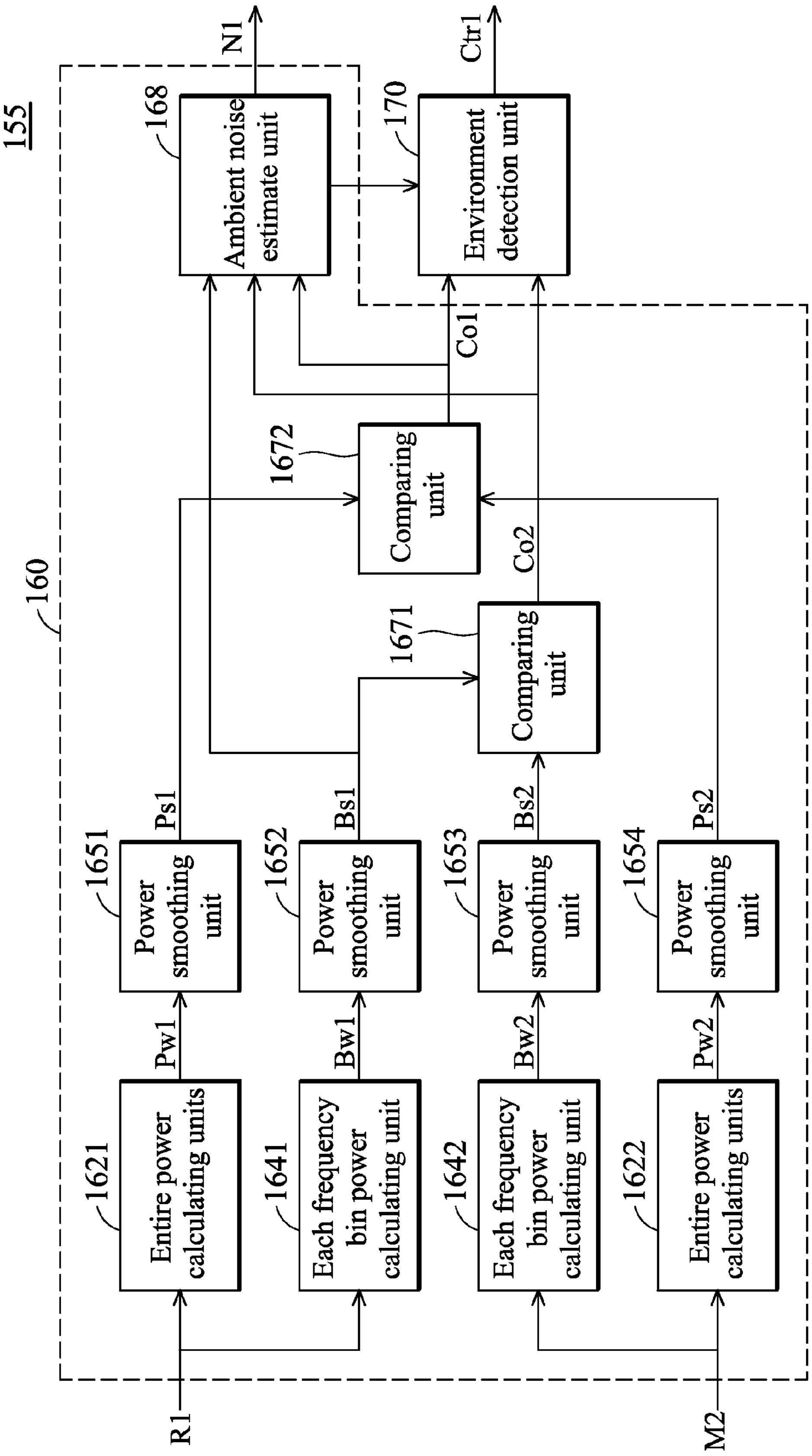
FIG. 4 is a schematic diagram of a detection unit according to another embodiment of the invention.

FIG. 4 is a schematic diagram of detection unit 155 according to another embodiment of the invention. Detection unit 155 comprises ambient noise estimate unit 160 and environmental detection unit 170. Ambient noise estimate unit 160 comprises entire power calculating units 1621 and 1622, each frequency bin power calculating units 1641 and 1642, power smoothing units 1651, 1652, 1653 and 1654, comparing units 1671 and 1672 and noise estimate unit 168. Entire power calculating unit 1621 calculates the entire power of reference channel signal R1 to output power signal Pw1. Power smoothing unit 1651 smoothes power signal Pw1 to output power signal Ps1. Each frequency bin power calculating unit 1641 calculates the power of each frequency bin to output power signal Bw1. Power smoothing unit 1652 smoothes power signal Bw1 to output power signal Bs1.

Similarly, entire power calculating unit 1622 calculates the entire power of main channel signal M2 to output power signal Pw2. Power smoothing unit 1654 smoothes power signal Pw2 to output power signal Ps2. Each frequency bin power calculating unit 1642 calculates the power of each frequency bin to output power signal Bw2. Power smoothing unit 1653 smoothes power signal Bw2 to output power signal Bs2. It is noted that main channel signal M2 provides noise detection.

Comparing unit 1672 compares power signals Ps1 and Ps2 to generate control signal Co1. Control signal Co1 is power signal Ps1 divided by power signal Ps2. Similarly, comparing unit 1671 compares power signals Bs1 and Bs2 to generate control signal Co2. Control signal Co2 is power signal Bs1 divided by power signal Bs2. Noise estimate unit 168 receives control signals Co1 and Co2 and power signal Bs1 to generate noise estimate signal N1. Environmental detection unit 170 generates control signal Ctrl to control directional microphone unit 120 to form different polar patterns according to control signals Co1 and Co2 and power signal Bs1 more or less than predefined values. If all control signals Co1 and Co2 and power signal Bs1 are more than predefined values, it is determined that the environmental noise power exceeds the predefined threshold (noise environment) and the polar pattern of first directional microphone signal dm1 is super-cardioid or hyper-cardioid polar pattern.

If none of control signals Co1 and Co2 and power signal Bs1 exceeds predefined values, it means that the environmental noise power doesn't exceed the predefined threshold (quiet environment) and the polar pattern of first directional microphone signal dm1 is a similar omni-directional polar pattern.

Figure 5:
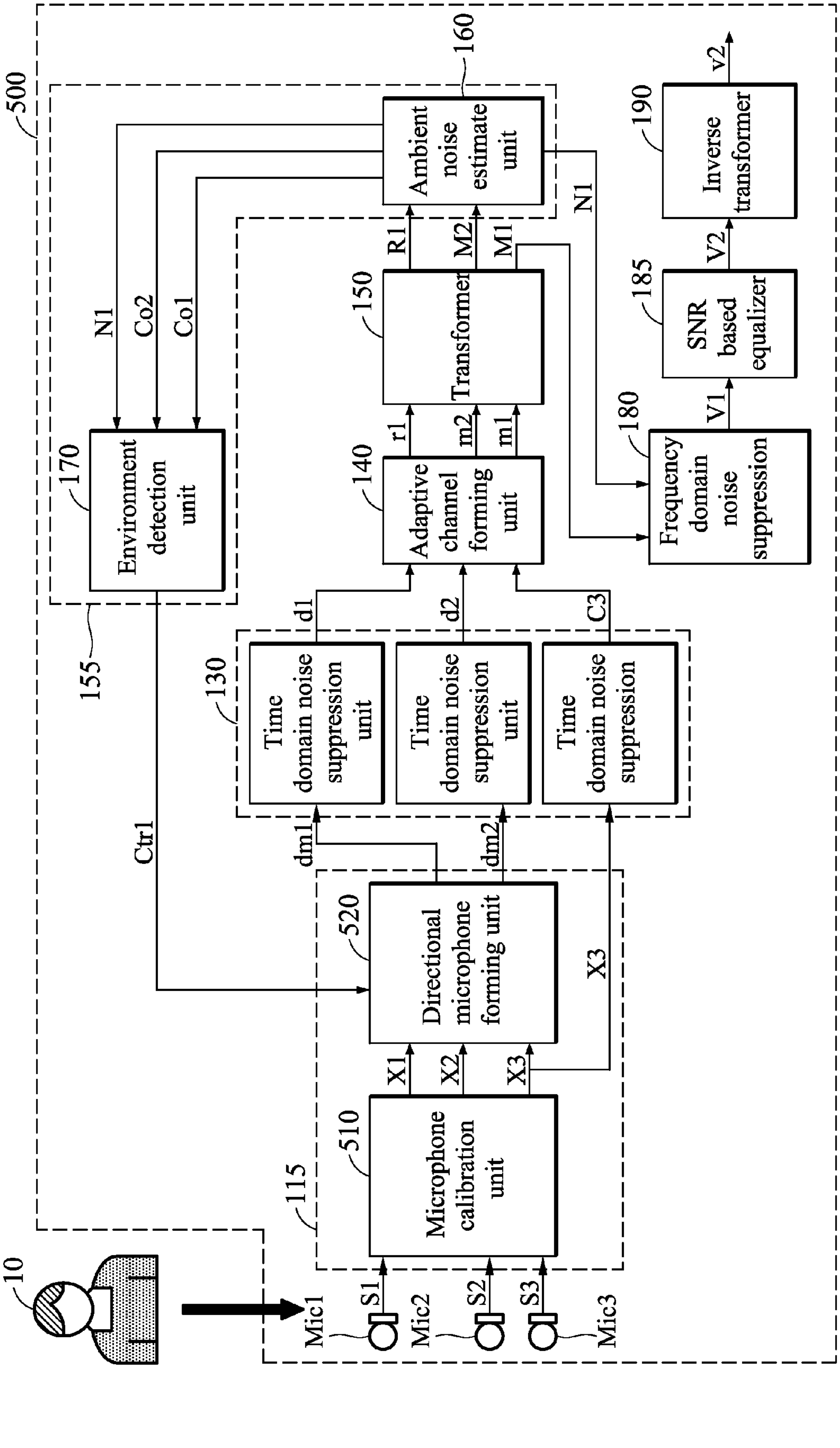
FIG. 5 is a schematic diagram of a small array microphone apparatus according to another embodiment of the invention.

FIG. 5 is a schematic diagram of a small array microphone apparatus 500 according to another embodiment of the invention. Small array microphone apparatus 500 comprises omni-directional microphones Mic1, Mic2 and Mic3, microphone calibration unit 510, directional microphone forming unit 520, time domain noise suppression unit 130, adaptive channel forming unit 140, transformer 150, detection unit 155, frequency domain noise suppression unit 180, SNR based equalizer 185 and inverse transformer 190. The differences between small array microphone apparatus 500 and small array microphone apparatus 100 are one more omni-directional microphones Mic3, microphone calibration unit 510 and directional microphone forming unit 520. Especially, directional microphone forming unit 520 is big different and discussed as followed.

Figure 6:
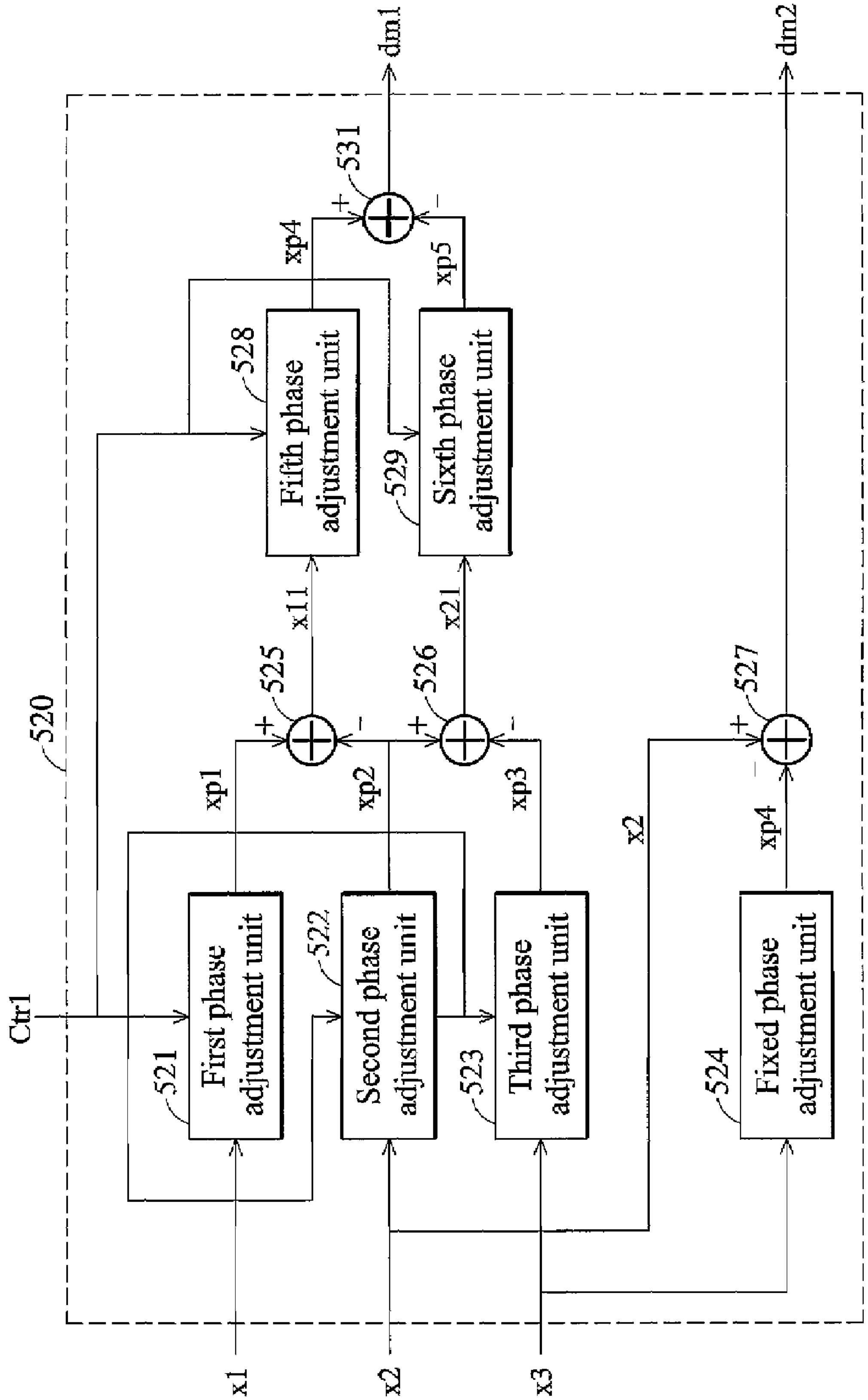
FIG. 6 is a schematic diagram of a directional microphone forming unit according to another embodiment of the invention.

FIG. 6 is a schematic diagram of directional microphone forming unit 520 according to another embodiment of the invention. Directional microphone forming unit 520 comprises first phase adjustment unit 521, second phase adjustment unit 522, third phase adjustment unit 523, fixed phase adjustment unit 524, fifth phase adjustment unit 528, sixth phase adjustment unit 529 and subtractors 525, 526 and 527. Directional microphone forming unit 520 is a two order directional microphone forming unit with two-stage processing. In the first stage, calibration signals X1, X2 and X3 are respectively sent to first phase adjustment unit 521, second phase adjustment unit 522 and third phase adjustment unit 523 to phase-shift P1 for calibration signal X1, P2 for calibration signal X2 and P3 for calibration signal X3 to acquire three phase shifted signals XP1, XP2 and XP3. Subtractors 525 and 526 generate signals X11 and X21 by subtracting signal XP2 from signal XP1 and signal XP3 from signal XP2. Control signal Ctrl is used to control the phase shift values, P1, P2 and P3, to get three phase shifted signal XP1, XP2 and XP3 and further forms the first stage directivity. In the second stage, signals X11 and X21 are respectively sent to fifth phase adjustment unit 528 and sixth phase adjustment unit 529 to phase-shift P11 for signal X11 and P21 for signal X21 to get two phase shifted signals XP4 and XP5.

Subtractor 531 generates first directional microphone signal dm1 with a predefined directivity by subtracting signal XP5 from signal XP4. Control signal Ctrl is used to control the phase shift values, P11 and P21, to acquire two phase shifted signals XP4 and XP5 and further forms the second stage directivity. Similarly, subtractor 527 generates second directional microphone signal dm2 with a fixed directivity by subtracting signal XP4 from calibration signal X2.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A small array microphone apparatus, comprising:

first and second omni-directional microphones respectively converting sound from a desired near-end talker into first and second signals, wherein the second and first omni-directional microphones and the desired near-end talker are arranged in a line;

a microphone calibration unit receiving the first and second signals, calibrating on gain, and correspondingly outputting first and second calibration signals; and a directional microphone forming unit receiving the first and second calibration signals to output a first directional microphone signal with a predefined directivity according to a control signal and a second directional microphone signal with a fixed directivity for noise detections, further comprises:

a first phase adjustment unit shifting the first calibration signal a first phase according to the control signal to generate a first shifted signal, the first phase being a first value for compensating sound propagation from the first omni-directional microphone to the second omni-directional microphone when the environmental noise power is below the predefined threshold, the first phase being less than the first value when the environmental noise power exceeds the predefined threshold;

a second phase adjustment unit shifting the second calibration signal a second phase according to the control signal to generate a second shifted signal, wherein the second phase is 180° when the environmental noise power is below the predefined threshold, or 0° when the environmental noise power exceeds the predefined threshold;

a third phase adjustment unit shifting the second calibration signal a fixed phase to generate a third signal;

a first subtractor subtracting the second shifted signal from the first shifted signal to generate the first directional microphone signal; and a second subtractor subtracting the third signal from the first shifted signal to generate the second directional microphone signal wherein determination of the control signal is based on whether environmental noise power generated by an environmental detection unit exceeds a predefined threshold.

2. The small array microphone apparatus as claimed in claim 1, wherein the second directional microphone signal with fixed directivity is a signal with a cardioid, super-cardioid or hyper-cardioid polar pattern for noise detection.

3. The small array microphone apparatus as claimed in claim 1, wherein the first directional microphone signal with a predefined directivity is a signal with a similar omni-directional polar pattern when the environmental noise power is below the predefined threshold or a cardioid polar pattern polar pattern when the environmental noise power exceeds the predefined threshold.

4. The small array microphone apparatus as claimed in claim 1, wherein the microphone calibration unit further comprises:

a power detection unit detecting power of each band of the first and second signals;

a power smoothing unit smoothing each band of the first and second signals;

a calibration unit calibrating each band of the first signal and the second signal by multiplying calibrating gains to each band of the first signal, wherein the calibrating gains are generated by each band of the second signal divided by each band of the first signal; and a subband synthesis unit synthesizing each band of the first and second signals to generate the first and second calibration signals.

5. The small array microphone apparatus as claimed in claim 1, further comprising:

a noise suppression unit receiving the first and second directional microphone signals and the second calibration signal, suppressing noise in time domain, and correspondingly outputting a first directional signal, a second directional signal and a third calibration signal;

an adaptive channel forming unit receiving the first and second directional signals and the third calibration signal to generate a first main channel signal, a second main channel signal and a first reference channel signal; and a transformer transforming the first main channel signal, the second main channel signal and the first reference signal from time domain to frequency domain to correspondingly output a third main channel signal, a fourth main channel signal and a second reference channel signal.

6. The small array microphone apparatus as claimed in claim 5, further comprising a detection unit receiving and comparing the second reference channel signal and the fourth main channel signal to output the control signal to control the first directional microphone signal with the predefined directivity.

7. The small array microphone apparatus as claimed in claim 6, wherein the detection unit further comprises:

an ambient noise estimate unit receiving and comparing the second reference channel signal and the fourth main channel signal to output a noise estimate signal, a first comparing signal and a second comparing signal; and the environmental detection unit detecting the noise estimate signal, the first comparing signal and the second comparing signal and generating the control signal according to the environmental noise power, wherein the environmental noise power is generated according to the noise estimate signal, the first comparing signal and the second comparing signal.

8. The small array microphone apparatus as claimed in claim 7, further comprising:

a frequency domain noise suppression unit receiving the third main channel signal and the second reference channel signal, suppressing noise of the third main channel signal and generating a first clear voice signal;

a SNR based equalizer equalizing the first clear voice signal to generate a second clear voice signal; and an inverse transformer transforming the second clear voice signal from frequency domain to time domain to generate a third clear voice signal.

9. A noise suppression method, comprising:

arranging first and second omni-directional microphones and a desired near-end talker in a line;

calibrating each band of a first signal and second signal from the first and second omni-directional microphones to correspondingly generate first and second calibration signals;

generating a first directional microphone signal with a predefined directivity according to the first calibration signal, the second calibration signal, and a control signal, wherein determination of the control signal is based on whether environmental noise power exceeds a predefined threshold; and generating a second directional microphone signal with fixed directivity for noise detection according to the first and second calibration signals;

suppressing noise of the first directional microphone signal, the second directional microphone signal and the second calibration signal to correspondingly generate a first directional signal, a second directional signal and a third calibration signal;

forming a first main channel signal, a second main channel signal and a first reference channel signal by using an adaptive channel forming unit according to the first and second directional signals and the third calibration signal;

transforming the first main channel signal, the second main channel signal and the third calibration signal from time domain to frequency domain to generate a third main channel signal, a fourth main channel signal and a second reference channel signal;

comparing the second reference channel signal and the fourth main channel signal to generate the control signal to control the first directional microphone signal with the predefined directivity;

suppressing noise of the third main channel signal and generating a first clear voice signal;

equalizing the first clear voice signal to generate a second clear voice signal; and transforming the second clear voice signal from frequency domain to time domain to generate a third clear voice signal.

10. The noise suppression method as claimed in claim 9, wherein calibration of each band of the first signal and second signal further comprises:

detecting power of each band of the first and second signals;

smoothing each band of the first and second signals;

calibrating each band of the first signal and the second signal by multiplying calibrating gains to each band of the first signal, wherein the calibrating gains are generated by each band of the second signal divided by each band of the first signal; and synthesizing each band of the first and second signals to generate the first and second calibration signals.

11. The noise suppression method as claimed in claim 9, wherein generation of the first and second directional microphone signals further comprises:

shifting the first calibration signal a first phase according to the control signal to generate a first shifted signal, the first phase being a first value compensating for sound propagation from the first omni-directional microphone to the second omni-directional microphone when the environmental noise power is below the predefined threshold, the first phase being less than the first value when the environmental noise power exceeds the predefined threshold;

shifting the second calibration signal a second phase according to the control signal to generate a second shifted signal, wherein the second phase is 180° when the environmental noise power is below the predefined threshold, or 0° when the environmental noise power exceeds the predefined threshold;

shifting the second calibration signal a fixed phase to generate a third signal;

subtracting the second shifted signal from the first shifted signal to generate the first directional microphone signal; and subtracting the third signal from the first shifted signal to generate the second directional microphone signal.

12. The noise suppression method as claimed in claim 9, wherein comparison of the second reference channel signal and the fourth main channel signal further comprises:

receiving and comparing the second reference channel signal and the fourth main channel signal to output a noise estimate signal, a first comparing signal and a second comparing signal; and detecting the noise estimate signal, the first comparing signal and the second comparing signal and generating the control signal according to the environmental noise power, wherein the environmental noise power is generated according to the noise estimate signal, the first comparing signal and the second comparing signal.

13. The noise suppression method as claimed in claim 9, wherein the second directional microphone signal with fixed directivity is a signal with a cardioid, super-cardioid or hyper-cardioid polar pattern for noise detection.

14. The noise suppression method as claimed in claim 9, wherein the first directional microphone signal with a predefined directivity is a signal with a similar omni-directional polar pattern when the environmental noise power is below the predefined threshold or a cardioid polar pattern polar pattern when the environmental noise power exceeds the predefined threshold.

15. A small array microphone apparatus, comprising:

first, second and third omni-directional microphones respectively converting sound from a desired near-end talker into first, second and third signals, wherein the third, second and first omni-directional microphones and the desired near-end talker are arranged in a line;

a microphone calibration unit receiving the first, second and third signals, calibrating on gain, and correspondingly outputting first, second and third calibration signals; and a directional microphone forming unit receiving the first, second and third calibration signals to output a first directional microphone signal with a predefined directivity according to a control signal and a second directional microphone signal with a fixed directivity for noise detection, wherein determination of the control signal is based on whether an environmental noise power generated by an environmental detection unit exceeds a predefined threshold;

a noise suppression unit receiving the first and second directional microphone signals and the second calibration signal, suppressing noise in time domain, and correspondingly outputting a first directional signal, a second directional signal and a third calibration signal;

an adaptive channel forming unit receiving the first and second directional signals and the third calibration signal to generate a first main channel signal, a second main channel signal and a first reference channel signal;

a transformer transforming the first main channel signal, the second main channel signal and the first reference signal from time domain to frequency domain to correspondingly output a third main channel signal, a fourth main channel signal and a second reference channel signal;

an ambient noise estimate unit receiving and comparing the second reference channel signal and the fourth main channel signal to output a noise estimate signal, a first comparing signal and a second comparing signal;

the environmental detection unit detecting the noise estimate signal, the first comparing signal and the second comparing signal and generating the control signal according to the environmental noise power, wherein the environmental noise power is generated according to the noise estimate signal, the first comparing signal and the second comparing signal;

a frequency domain noise suppression unit receiving the third main channel signal and the second reference channel signal, suppressing noise of the third main channel signal and generating a first clear voice signal;

a SNR based equalizer equalizing the first clear voice signal to generate a second clear voice signal; and an inverse transformer transforming the second clear voice signal from frequency domain to time domain to generate a third clear voice signal.

* * * * *